US011357168B2

(12) United States Patent
Fillep

(10) Patent No.: US 11,357,168 B2
(45) Date of Patent: Jun. 14, 2022

(54) TOWED IMPLEMENT THAT COMPENSATES FOR UNBALANCED LOADS CAUSED BY OFFSET CENTRE OF GRAVITY

(71) Applicant: AGCO International GmbH, Neuhausen (CH)

(72) Inventor: Johannes Fillep, Feucht (DE)

(73) Assignee: AGCO Feucht GmbH, Feucht (DE)

( * ) Notice: Subject to any disclaimer, the term of this patent is extended or adjusted under 35 U.S.C. 154(b) by 296 days.

(21) Appl. No.: 16/746,488

(22) Filed: Jan. 17, 2020

(65) Prior Publication Data

US 2020/0229339 A1     Jul. 23, 2020

(30) Foreign Application Priority Data

Jan. 18, 2019   (GB) ..................................... 1900703

(51) Int. Cl.
| | | |
|---|---|---|
| *A01D 34/66* | (2006.01) |
| *A01B 59/00* | (2006.01) |
| *A01B 59/06* | (2006.01) |
| *A01D 41/14* | (2006.01) |
| *A01D 43/10* | (2006.01) |

(52) U.S. Cl.
CPC .......... *A01D 34/661* (2013.01); *A01B 59/002* (2013.01); *A01B 59/06* (2013.01); *A01D 41/14* (2013.01); *A01D 43/107* (2013.01)

(58) Field of Classification Search
CPC ............ A01B 59/00–069; A01D 41/14; A01D 43/107; A01D 34/661; A01D 34/664; A01D 34/64; A01D 34/66; A01D 34/866; A01D 34/86; A01D 67/005
See application file for complete search history.

(56) References Cited

U.S. PATENT DOCUMENTS

| | | |
|---|---|---|
| 2,140,144 A | 12/1938 | Silver |
| 2,888,997 A | 6/1959 | Fraga |
| (Continued) | | |

FOREIGN PATENT DOCUMENTS

| | | |
|---|---|---|
| CA | 2 561 463 A1 | 3/2008 |
| EP | 2 644 015 A2 | 10/2013 |
| (Continued) | | |

OTHER PUBLICATIONS

European Patent Office, Search Report for related European application No. EP20150347.1, dated May 29, 2020.
(Continued)

*Primary Examiner* — Adam J Behrens

(57) ABSTRACT

A towed agricultural implement including a first headstock element for connection to a towing vehicle, a second headstock element supporting a chassis member provided with a plurality of working implements, a pivot pin for connecting the first headstock member and the second headstock member and defining a horizontal axis of rotation between the first headstock member and the second headstock member, in which the second headstock member has a lateral centre of gravity offset from the axis of rotation. A compensating structure is provided between the first headstock member and the second headstock member to offset the unbalanced loads caused by the lateral centre of gravity being offset from the axis of rotation.

7 Claims, 11 Drawing Sheets

(56) References Cited

U.S. PATENT DOCUMENTS

| | | | | | |
|---|---|---|---|---|---|
| 5,353,579 | A | * | 10/1994 | Wolff | A01B 61/04 |
| | | | | | 56/15.2 |
| 5,901,537 | A | * | 5/1999 | Walch | A01D 34/661 |
| | | | | | 56/15.2 |
| 6,128,892 | A | * | 10/2000 | Neuerburg | A01D 34/661 |
| | | | | | 56/15.2 |
| 2016/0255762 | A1 | * | 9/2016 | Billard | A01B 73/06 |
| 2017/0127614 | A1 | * | 5/2017 | Button | A01D 34/005 |
| 2017/0339831 | A1 | * | 11/2017 | Zanini | A01D 67/005 |
| 2018/0139888 | A1 | * | 5/2018 | McHale | A01B 59/066 |

FOREIGN PATENT DOCUMENTS

| | | | |
|---|---|---|---|
| EP | 3216338 A1 | 9/2017 | |
| WO | 2008/034217 A1 | 3/2008 | |
| WO | WO-2015097230 A1 * | 7/2015 | ........... A01B 73/005 |
| WO | WO-2016185455 A1 * | 11/2016 | ........... A01D 34/661 |

OTHER PUBLICATIONS

UK Intellectual Property Office, Search Report prepared for priority application No. GBI900703.8, dated Jul. 11, 2019.

* cited by examiner

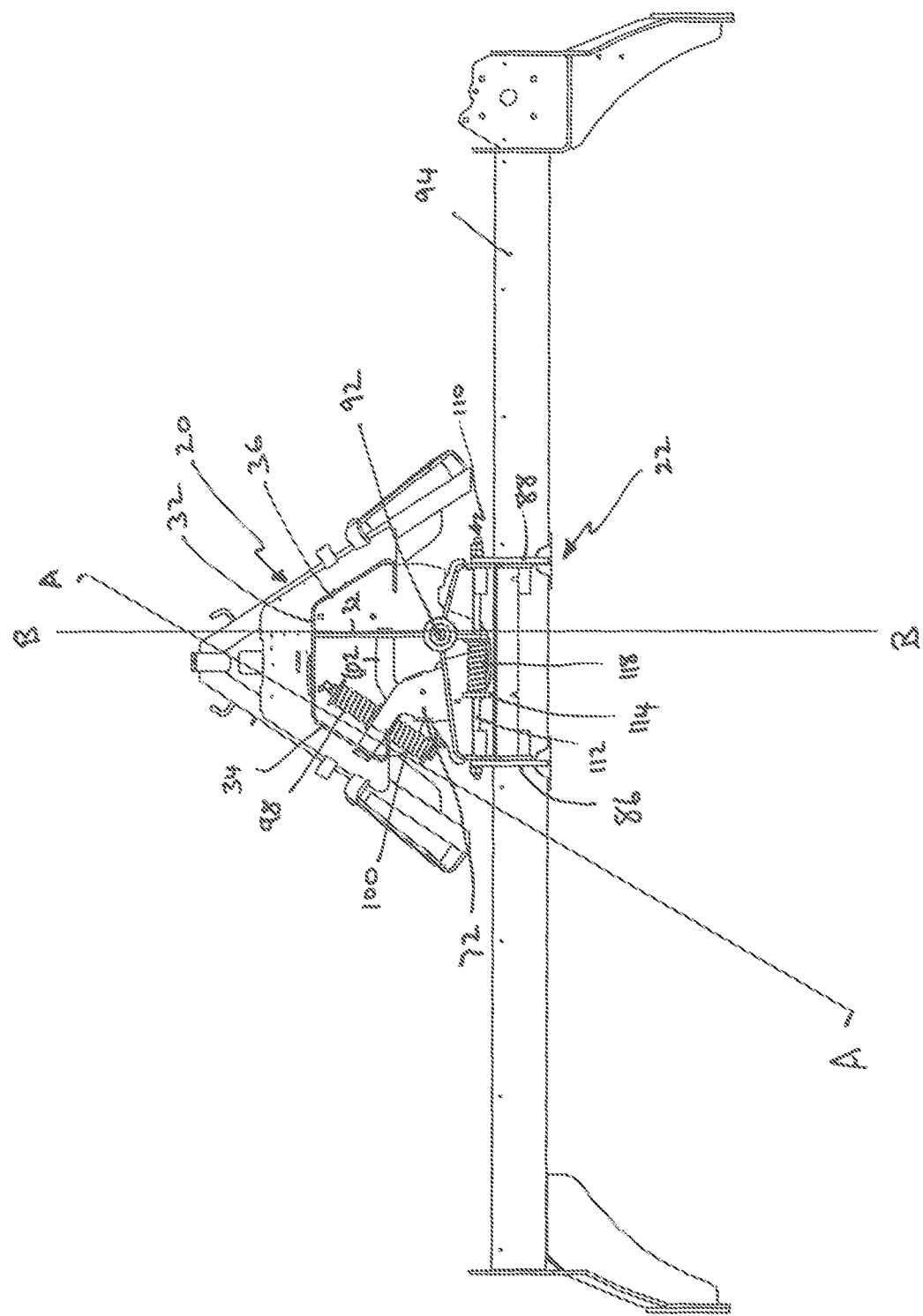

TOWED IMPLEMENT THAT COMPENSATES FOR UNBALANCED LOADS CAUSED BY OFFSET CENTRE OF GRAVITY

BACKGROUND

Field

The present invention relates to a hay tool and in particular to a mower.

Description of Related Art

It is known to provide towed agricultural implements, such as mowers, which may be towed from an agricultural vehicle, such as a tractor. Such towed agricultural implements include left hand side and right hand side working implements for processing a crop, the working implements being carried from a central towing structure. A hitch provided on the towed agricultural implement connects the towing vehicle with the towed agricultural implement.

Conveniently a main chassis member of the towed agricultural implement is suspended about a horizontal pivot axis from the hitch. Preferably the horizontal pivot axis is aligned with the lateral centre of gravity of the towed agricultural implement. In practice, this is not always the case. For example for reasons of manufacturing efficiency, a common design of main chassis member may be designed for use with a variety of working implements, for example different mowing units, such as a mower with and without a conditioner unit. Such different working implements will result in the resulting towed agricultural implements all having slightly different centres of gravity offset to some degree from one another. As such the location of the horizontal pivoting axis will be designed to provide a best fit for the most common centres of gravity for a given main chassis member.

While this solution generally works well, in practice it leads to different bearing loads with potential disadvantages as explained below.

The towed agricultural implement is provided with pre-stressed springs to maintain the towed agricultural implement in a neutral or "zero position" when the towed agricultural implement is in either a headland or transport position. However, where the location of the horizontal pivoting axis is offset from the centre of gravity, these springs are loaded differently. This can lead to different strong deflections in the transport or headland position, especially when cornering. Also the different forces of the springs lead to different strong tracking weights on the sides of the towed agricultural implement, when the towed agricultural implement tilts out of the "zero position".

It is an advantage of the present invention that a solution to this problem is provided.

BRIEF SUMMARY

According to a first aspect of the present invention, a towed agricultural implement comprises a first headstock element for connection to a towing vehicle, a second headstock element supporting a chassis member provided with a plurality of working implements, a pivot pin for connecting the first headstock member and the second headstock member and defining a horizontal axis of rotation between the first headstock member and the second headstock member, in which the second headstock member has a lateral centre of gravity offset from the axis of rotation characterised in that a compensating structure is provided between the first headstock member and the second headstock member.

The compensating structure compensates the unequal bearing loads for different towed agricultural implements with different centres of gravity.

Preferably the compensating structure comprises a biasing member acting between the first headstock element and the second headstock element. The biasing member has resilient/resilient and damping properties to allow lateral oscillation of the towed agricultural implement to be damped. A further advantage is that swinging up of the agricultural implement in a transport position can be prevented.

More preferably, the biasing member is located between a pivoting member forming part of the first headstock element and a stop plate provided on the second headstock element. More preferably, the stop plate is adjustable.

Preferably, the pivoting member pivots about the axis of rotation defined by the pivot pin.

Preferably, the biasing member is mounted on the second headstock element.

More preferably, the biasing member comprises an elastic spring element, for example a helical spring or rubber buffer mounted on a connecting member.

Preferably, the towed agricultural implement further comprises a balanced elastic spring unit mounted between the first headstock member and the second headstock member.

Preferably, the working implements comprise cutting units for a mower. Alternatively, the working units comprises cutting units and a conditioner for a mower.

BRIEF DESCRIPTION OF THE DRAWINGS

The invention will now be described, by way of example only, with reference to the accompanying drawings, in which:

FIG. 4A shows a schematic rear view of showing the hitch in a neutral position when trailing a first towed agricultural implement;

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
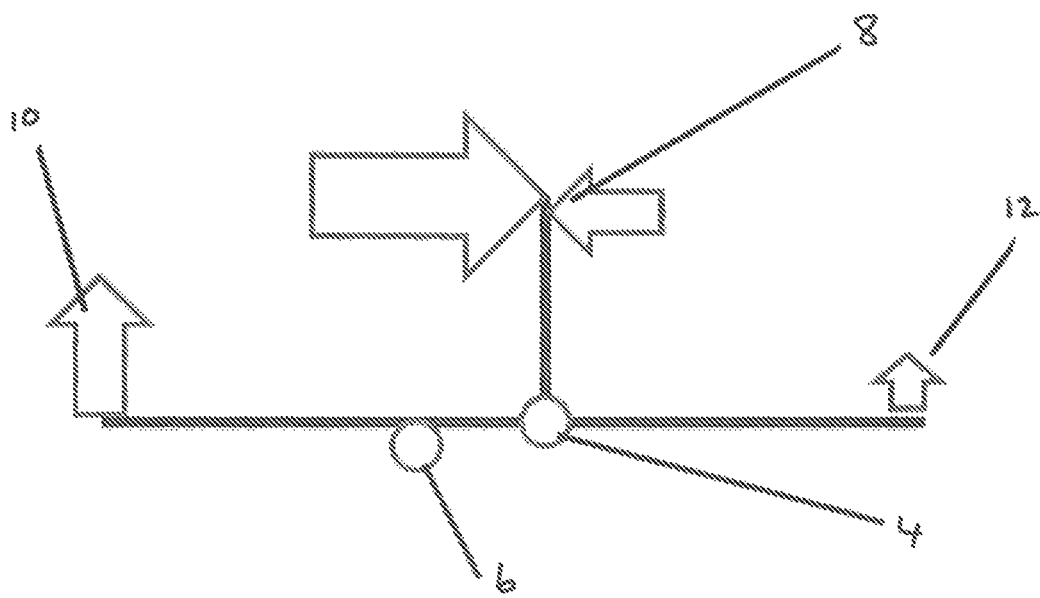
FIG. 1 shows a schematic view of the forces acting on a known towed agricultural implement.

With reference to FIG. 1, a schematic view of the forces acting on a known towed agricultural implement is shown. A lateral axis 2 of a main chassis member of a towed agricultural implement is provided with a pivot axis 4 between the main chassis member and the hitch assembly. The main chassis member is fixed in a neutral or "zero position" by the use of balanced prestressed spring units. However, due to the distribution of a mass of the towed agricultural implement, a lateral centre of gravity 6 is offset from the pivot axis 4. This results in an offset load 8 on the towed agricultural implement with a larger bearing load 10 on a first side of the towed agricultural implement and a smaller bearing load 12 on a second side of the towed agricultural implement.

Since the focal points of the working implements, such as mowing units, provided on the towed agricultural implement vary in the transverse direction, these springs are loaded differently. Accordingly, the working implements are not suspended in alignment with the centre of gravity in the transverse direction, and since the working implements are offset from the "zero position" different bearing loads result between the ground and the working implements. Also the uneven loading of the springs may lead to different strong deflections in the transport position, especially when cornering.

Referring now to FIGS. 3, 4A, 4B and 4C, there are shown elements of a hitch assembly for use in the present invention, including a first headstock element 20 and a second intermediate headstock element 22 in a neutral position.

Figure 4B:
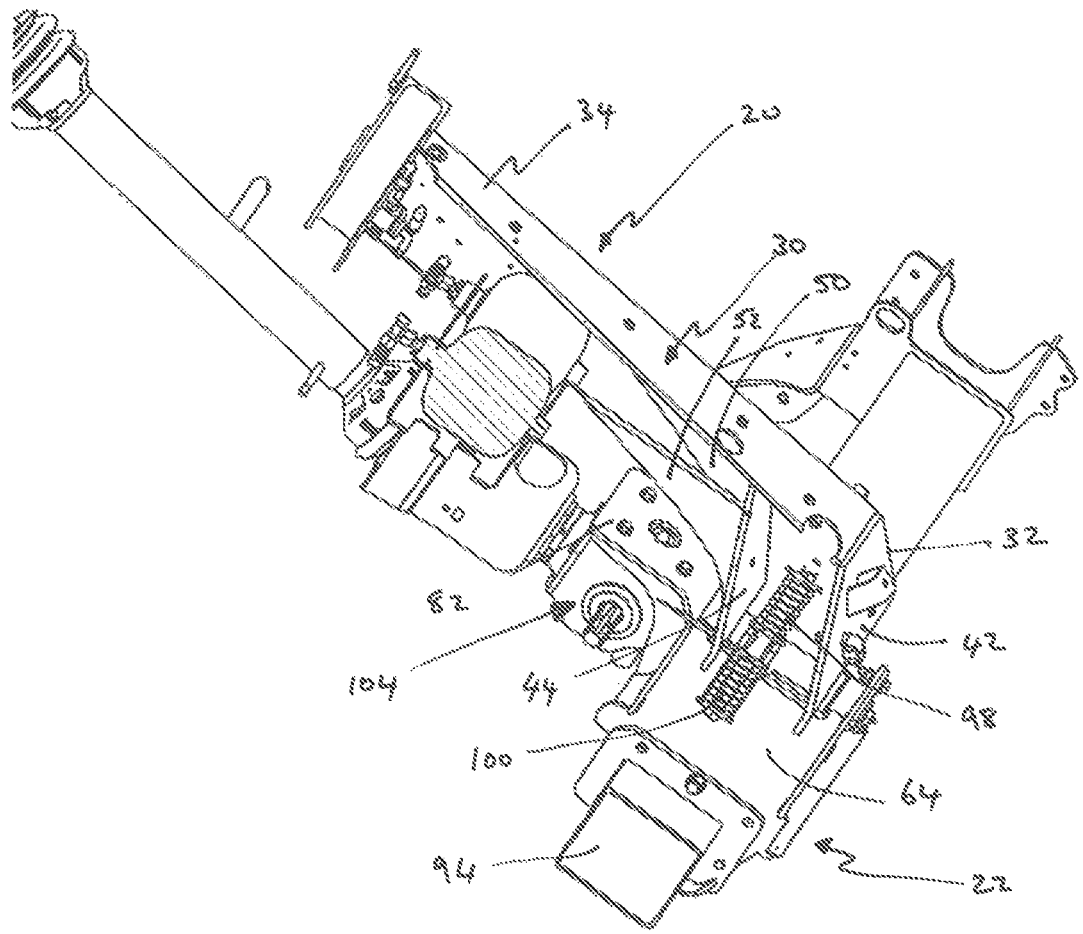
FIG. 4B shows a section view along line A-A of FIG. 4A.
Figure 4C:
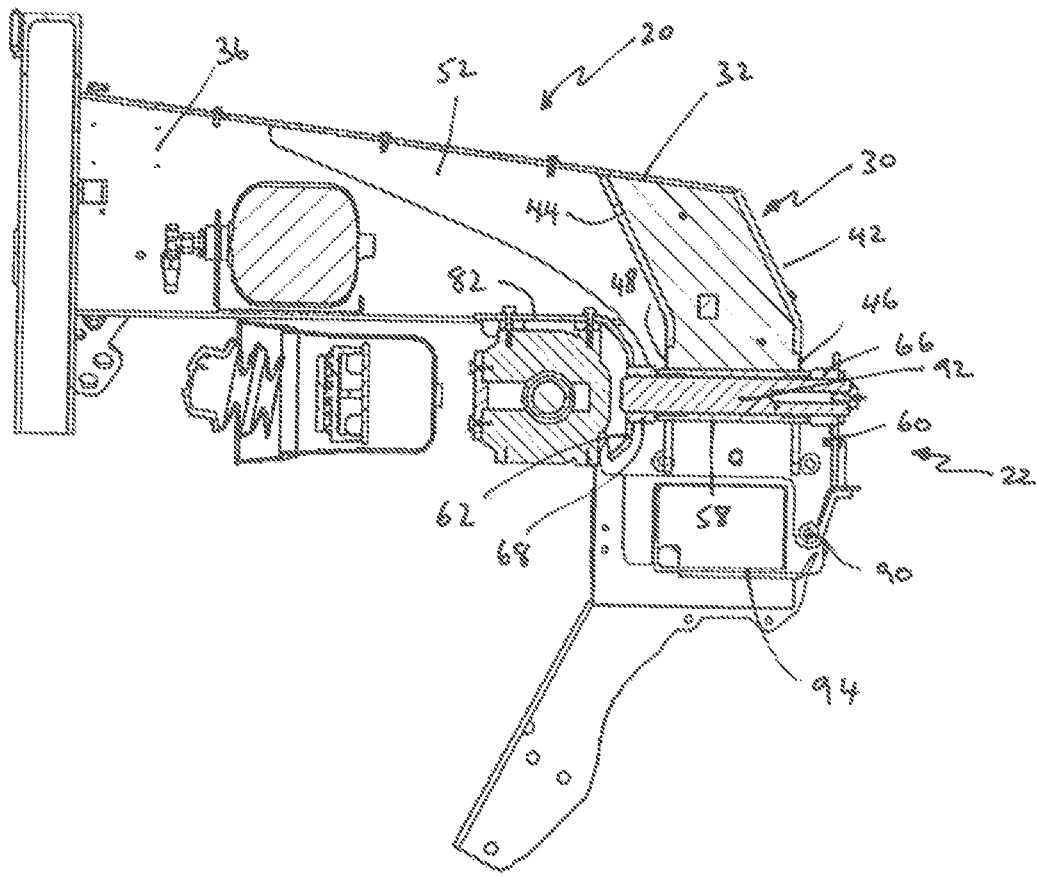
FIG. 4C shows a sectional view along line B-B of FIG. 4A.
Figure 4D:
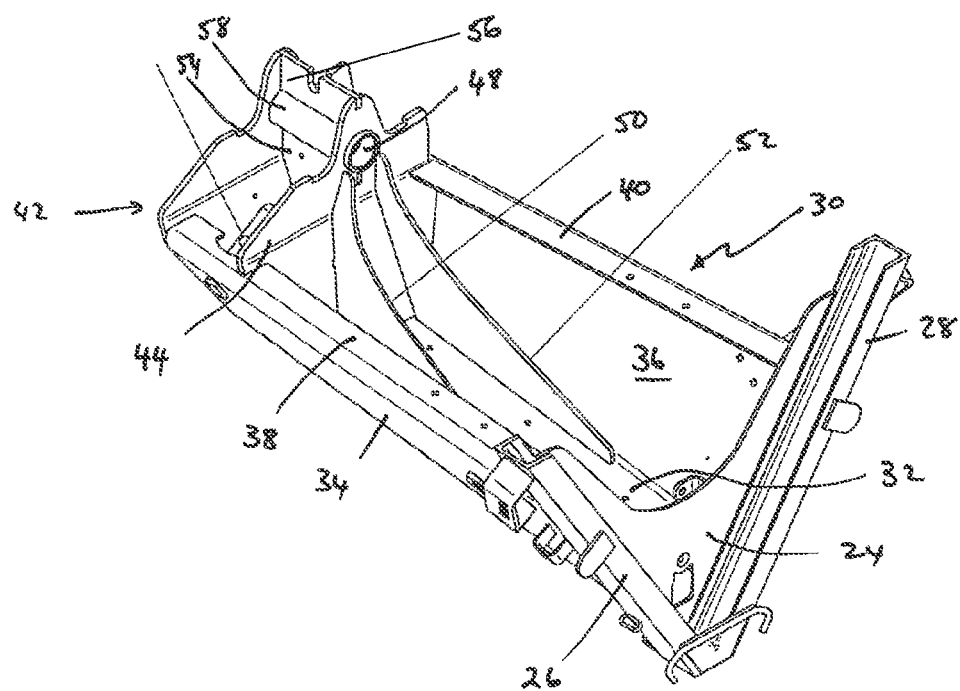
FIG. 4D shows a perspective view of a first headstock element for use with the present invention.

The first headstock element 20 (FIG. 4D) comprises a frame structure comprising a substantially triangular back panel 24 connected to first and second inclined uprights 26,28. The first and second inclined uprights are conveniently connected at their upper ends. A first upper hitch fixing is provided at the upper ends of the first and second inclined uprights. Each of the first and second inclined uprights is also provided a with a lower hitch fixing. It will be understood that the upper and lower hitch fixings are used when attaching the towed agricultural implement to a three point hitch of a towing vehicle.

The back panel 24 is provided with a longitudinally extending cover member 30. The longitudinally extending cover member 30 comprises a generally inclined upper portion 32 with first and second side portions 34,36 extending downward at an angle thereto. Each of the first and second side portions 34,36 terminate with an inwardly directed generally horizontal portion 38,40.

A front wall 42 is connected to the free end the cover member 30. An upper part of the front wall 42 is inclined and a lower part depends substantially vertically therefrom. A second wall 44 is provided offset from the front wall and extends generally parallel to the front wall 42.

Each of the front wall 42 and the second wall 44 are provided with a protrusion including a circular opening 46,48 offset to one side. A pair of substantially triangular vertical reinforcing members 50,52 are provided, each connecting the inclined upper portion 32 of the cover member and the second wall 44. Each of the vertical reinforcing members 50,52 extend from the inclined upper portion 32 of the cover member towards the offset circular opening 48 of the second wall 44. A generally vertical member extends from the inclined upper portion between the front wall and the second wall. The generally vertical member comprises a first larger portion 54 connected to the upper portion 32, a second smaller portion 56 and a tubular support 58 between the first and second portions 54,56, the ends of which are adapted, in use, to be aligned with the circular openings 46,48 of the front wall 42 and the second wall 44.

Figure 4E:
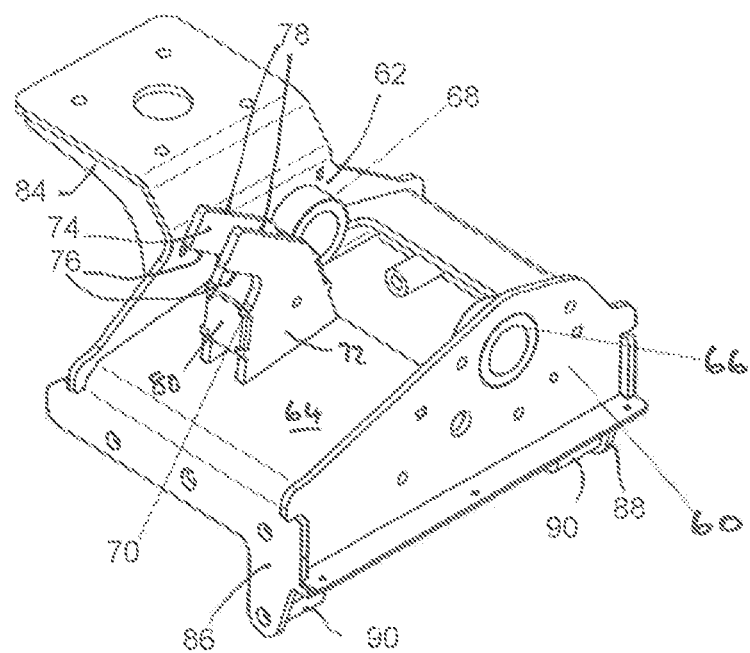
FIG. 4E shows a perspective view of an intermediate headstock element for use with the present invention.

The intermediate headstock element 22 (FIG. 4E) comprises a first front panel 60 and a second rear panel 62 joined by a central web 64. Each of the first front panel 60 and the second rear panel 62 is provided with a bushing 66,68. A spring centring structure 70 is provided on the central web 64, comprising first and second upstanding elements 72,74 with angled fingers terminating in abutment surfaces 76,78. Conveniently the first and second upstanding elements 72,74 are held spaced from one another by a suitable reinforcing member 80.

The rear panel 62 is provided at an end remote from the central web with a mounting panel 82 extending away from and generally parallel to a plane of the central web 64. Reinforcing members 84 are provided between the rear panel 82 and the mounting panel 82. The mounting panel 82 is conveniently provided with a plurality of openings.

The intermediate headstock element 20 further comprises first and second side walls 86,88 extending from the central web 64 away from the spring centring structure 70. Each of the first and second side walls 86,88 is conveniently provided with a plurality of openings. The openings may conveniently be provided with threaded bushings 90.

In use the first headstock element 20 and the intermediate headstock element 22 are connected together such that the bushings 66,68 in the intermediate headstock element 22 are aligned with the tubular support 58 of the first headstock element 20 such that a suitable pivot pin 92 may extend through the tubular support 58 and the bushings 66,68 to support the intermediate headstock element 22 from the first headstock element 20. The intermediate headstock element 22 is secured to a main chassis member 94 of the towed agricultural implement in any suitable manner using the mounting points provided on the intermediate headstock element 22.

A prestressed biasing element 96 is mounted within the first headstock element 20 between the front and second walls 42,44. In use, the prestressed biasing element 96 extends between the first and second upstanding elements 72,74 of the spring support structure 70. The restressed biasing element 96 comprises a elongate member provided with end stops at each end. First and second adjustable stops are provided on the elongate member. First and second biasing members 98,100 are also provided on the elongate member. Each biasing member 98,100 is located between a fixed end stop and an adjustable stop. The biasing members 98,100 may take any suitable form. In the illustrated embodiment, helical springs are shown.

A first end of a generally L-shaped bracing element 102 is secured to one of the side portions of the first headstock element 34 and a second end of the bracing element 102 is secured to the first larger portion 54 of the vertical member between the front wall 42 and the second wall 44. The bracing element 102 extends between the first and second upstanding elements 72,74 of the spring centring structure 70 and in use between the adjustable stops of the prestressed biasing element 96.

A drive connection 104 for the drive means for the working implements is conveniently mounted to the mounting panel 82 of the intermediate headstock element 22. In use, the drive connection 104 is connected in any suitable known manner to a PTO of a towing vehicle.

An compensating structure 110 is provided on the intermediate headstock element 22. A pin 112 extends between the first and second side walls 86,88 of the intermediate headstock element 22 and through the second smaller portion 56 of the vertical member of the first headstock element 20. The second smaller portion 56 is conveniently provided with a cutaway portion to allow the presence of the pin the stop plate 114 and the abutment plate 116. A stop plate 114 and an abutment plate 116 are mounted on the pin 112. The abutment plate 116 abuts the smaller portion 56. The stop plate 114 is located in a preselected position. Conveniently the pin 112 may be threaded, for example it may take the form of a threaded bolt, and the stop plate 114 is screwed onto the pin 112 into the desired preselected position and the abutment plate 116 is slid onto the pin 112. A biasing member 118 in the form of an elastic spring element is mounted between the stop plate 114 and the abutment plate 116. In the illustrated embodiment, the elastic spring element takes the form of a helical spring. Other suitable means for providing an elastic spring element may be used. For example a rubber buffer may be used as the elastic spring element.

Figure 2:
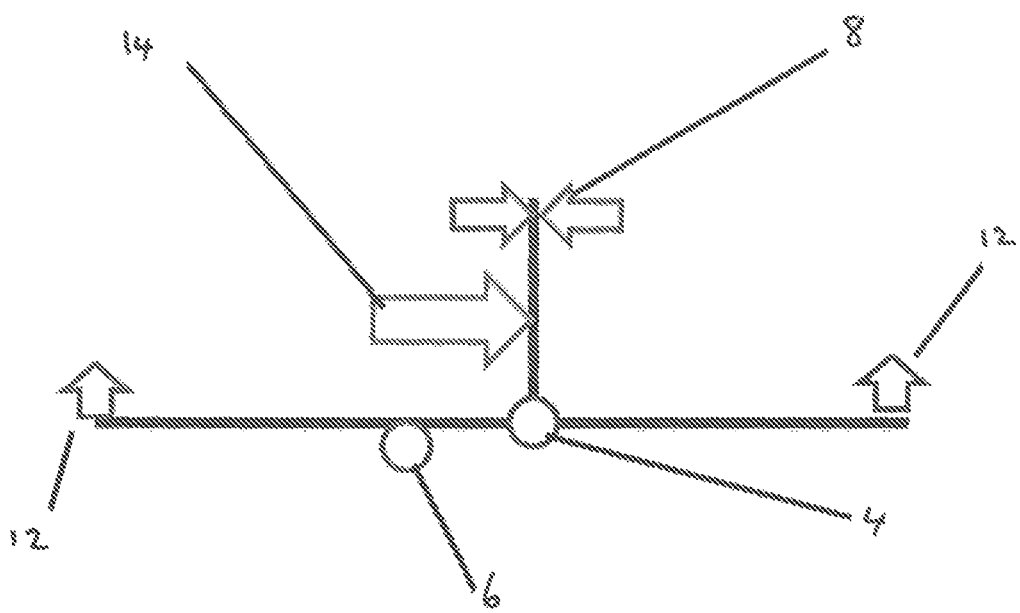
FIG. 2 shows a schematic view of the forces acting on a towed agricultural implement according to the present invention.
Figure 3:
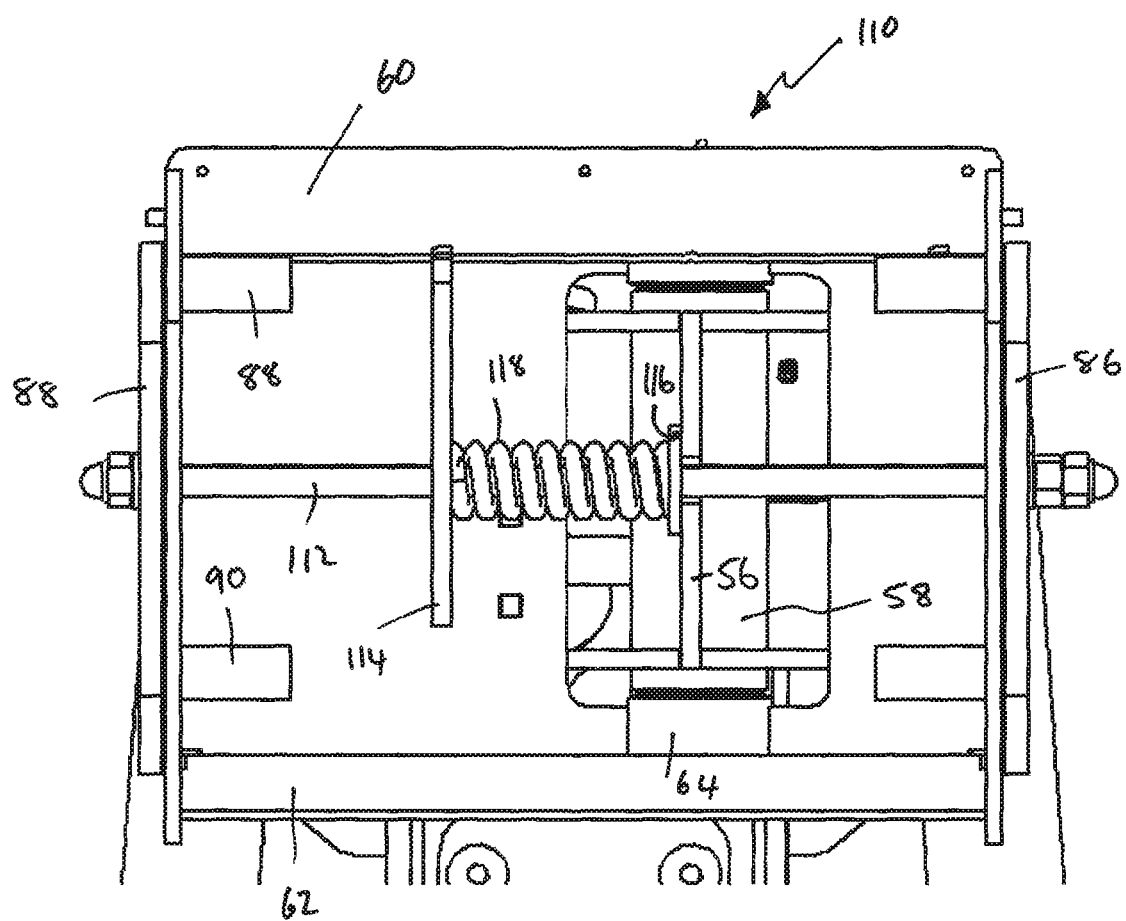
FIG. 3 shows an schematic view of part of a hitch for use in the present invention.

The purpose of the compensating structure can be understood with reference to FIG. 2. Like reference numerals are used to refer to like parts.

The forces 14 provided by the biasing means in the compensating structure balance the lateral centre of gravity 6 to the pivot axis 4 such that each side of the towed agricultural implement is subject to equal and reduced bearing loads 12.

Figure 6:
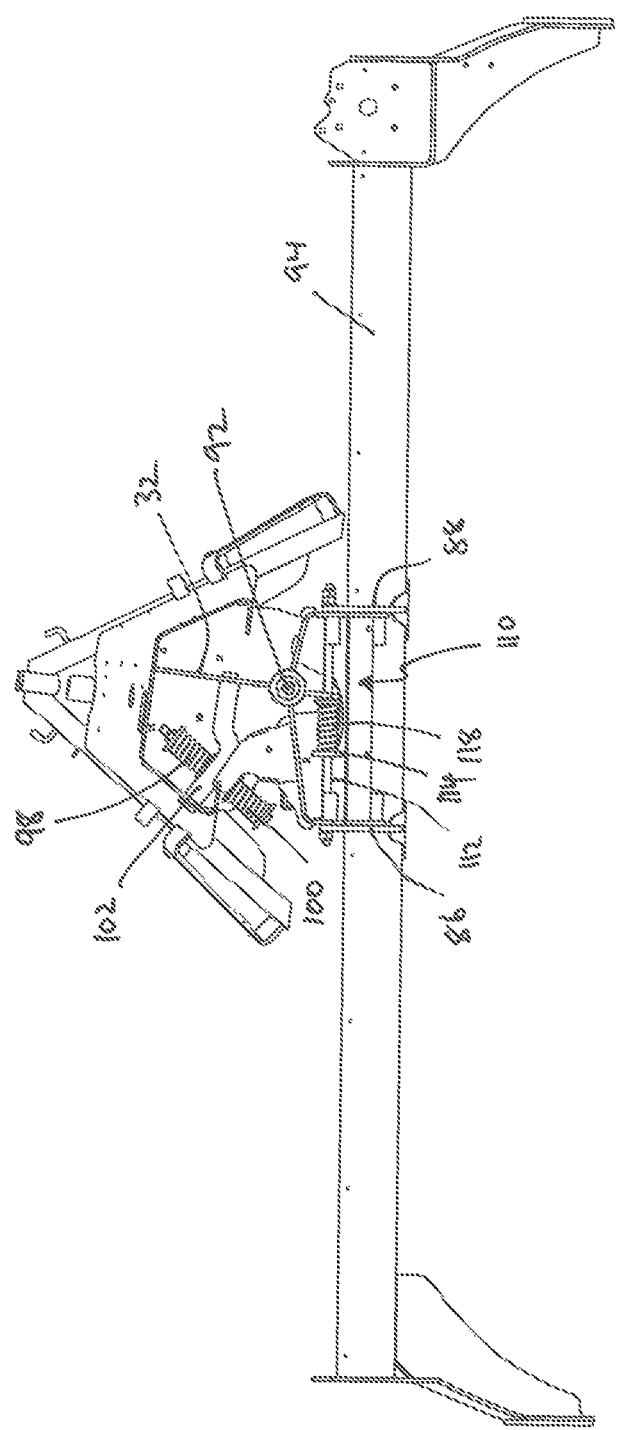
FIG. 6 shows a schematic rear view of the hitch of FIG. 4A in a first tilt position.
Figure 7:
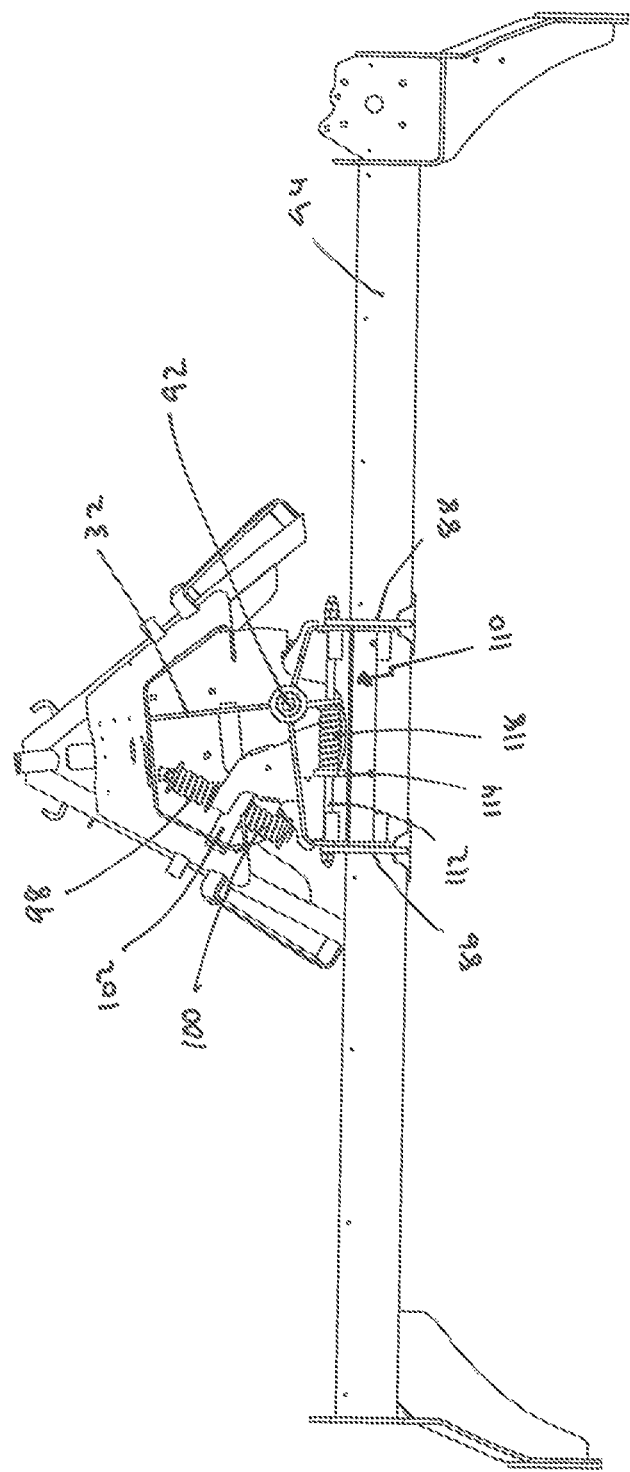
FIG. 7 shows a schematic rear view of the hitch of FIG. 4A in a second tilt position.

In FIGS. 4A, 6 and 7 the hitch for use in the present invention is shown set up for use with a first towed agricultural implement in which the centre of gravity is on the right hand side of the pivot axis, for example a mower with a conditioner. It can be seen that the biasing member 118 in the compensating structure 110 has been set up to the left side of the second smaller portion 56.

In the first tilt position of FIG. 6, the biasing member 118 in the compensating structure 110 is compressed as have each of the biasing members 98,100 of the prestressed biasing element 96, by the action of the bracing element 102 on the upper biasing member 98 and the lower abutment surfaces 76 of the fingers on the first and second upstanding elements 72,74 on the lower biasing member 100. In the second tilt position of FIG. 7, the biasing member 118 of the compensating structure 110 is allowed to extend and the biasing members 98,100 of the prestressed biasing element 96 are again compressed, by the action of the bracing element 102 on the lower biasing member 100 and the upper abutment surfaces 78 of the of the fingers on the first and second upstanding elements 72,74 on the upper biasing member 98.

Figure 5:
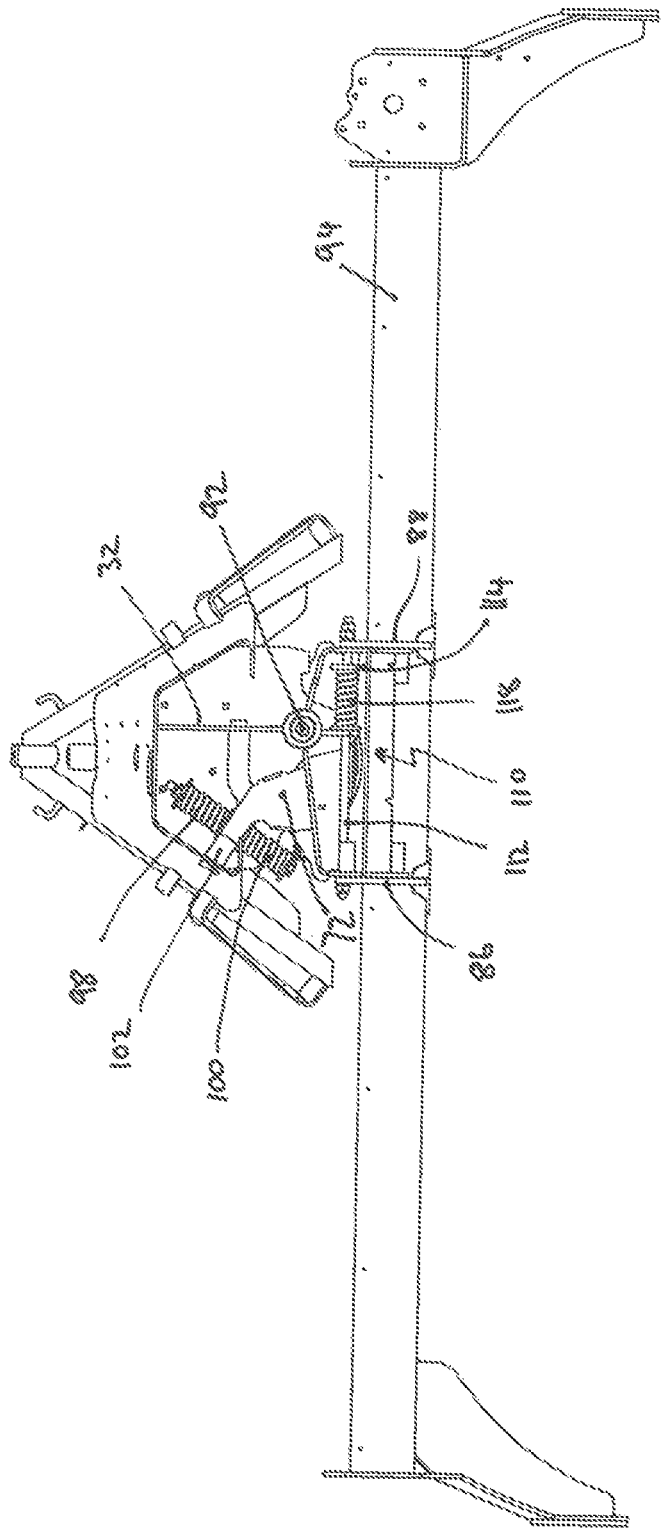
FIG. 5 shows a schematic rear view of the hitch of FIG. 4A in a neutral position when trailing a second towed agricultural implement with a different centre of gravity to the first agricultural implement.
Figure 8:
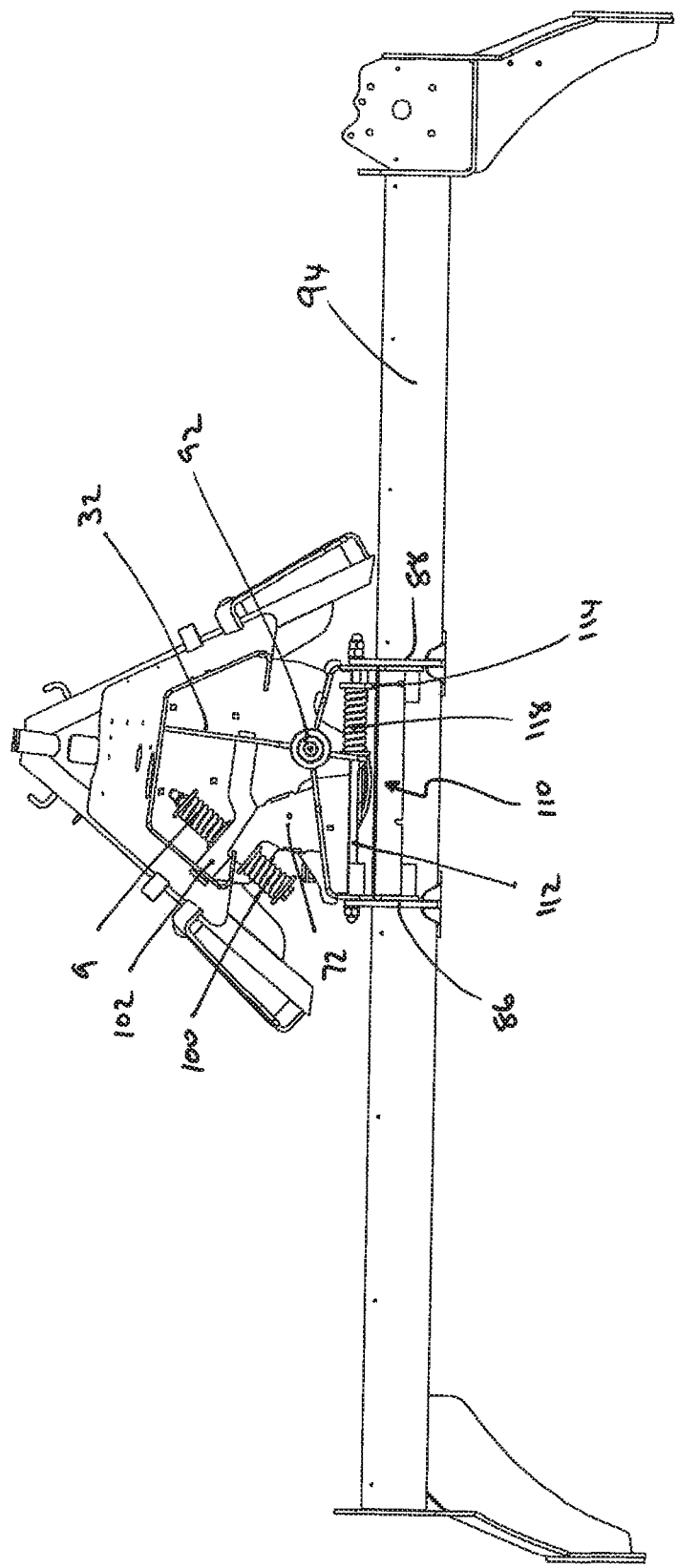
FIG. 8 shows a schematic rear view of the hitch of FIG. 5 in a first tilt position.
Figure 9:
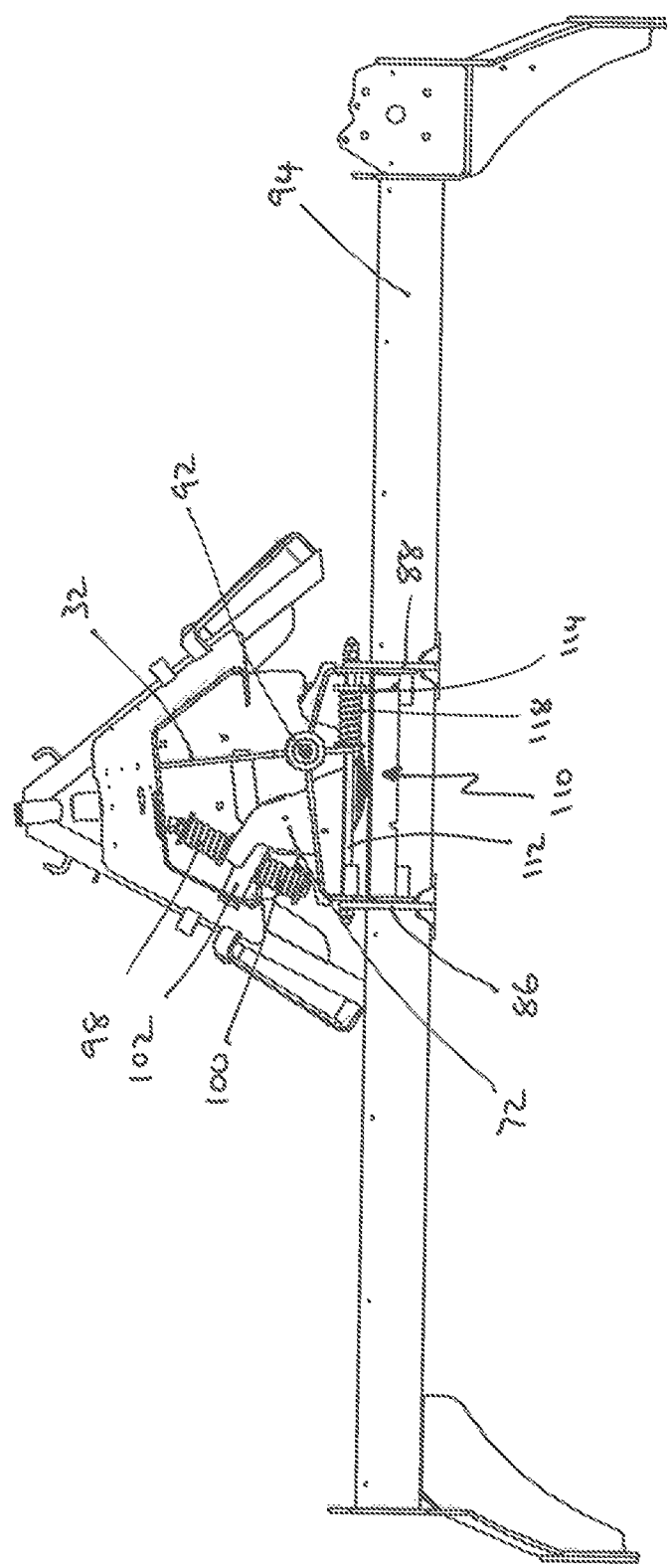
FIG. 9 shows a schematic rear view of the hitch of FIG. 5 in a second tilt position.

In FIGS. 5, 8 and 9 the hitch for use in the present invention is shown set up for use for a second towed agricultural implement in which the centre of gravity is on the left hand side of the pivot axis, for example a mower without a conditioner. Like reference numerals are used to refer to like parts. It can be seen that the biasing member 118 in the compensating structure 110 has been set up to the right side of the second smaller portion 56.

In the first tilt position of FIG. 8, the biasing member 118 of the compensating structure 110 is allowed to extend, whereas each of the biasing members 98,100 of the prestressed biasing element 96 are compressed, by the action of the bracing element 102 on the upper biasing member 98 and the lower abutment surfaces 76 of the fingers on the first and second upstanding elements 72,74. In the second tilt position of FIG. 9, the biasing member 118 of the compensating structure 110 is compressed as are the biasing elements 98,100, by the action of the bracing element 102 on the lower biasing member 100 and the upper abutment surfaces 78 of the fingers on the first and second upstanding elements 72,74 on the upper biasing member 98.

Since the compensating force can be calculated, a biasing member of suitable strength can be selected for the purpose. Since the stop plate is screwed into position, should the user or a service engineer need, after several years use, to adjust the force provided by the elastic spring element, the stop plate 114 may be moved along the pin 112.

It can be seen that the biasing member can mounted in a number of positions, resulting in a the same compensating structure being used as required in a particular agricultural implement in order to compensate for a particular offset in the centre of gravity.

From reading the present disclosure, other modifications will be apparent to persons skilled in the art. Such modifications may involve other features which are already known in the field of hay tools and component parts therefore and which may be used instead of or in addition to features already described herein.

The invention claimed is:

1. A towed agricultural implement comprising:
  a chassis member carrying a plurality of working elements;
  a first headstock element for connection of the agricultural implement to a towing vehicle;
  a second headstock element supporting the chassis member;
  a pivot pin connecting the first headstock element and the second headstock element and defining a horizontal axis of rotation between the first headstock element and the second headstock element,
  wherein the chassis member carrying the plurality of working elements extends transverse the horizontal axis of rotation such that the chassis member carries at least one of the plurality of working elements on a first side of the horizontal axis of rotation and at least one of the plurality of working elements on a second side of the horizontal axis of rotation opposite the first side, and wherein the towed agricultural implement has a lateral centre of gravity offset from the horizontal axis of rotation; and
  a biasing member acting between the first headstock element and the second headstock element, wherein the biasing member acts to compensate unequal loads resulting from different working elements causing a change in the centre of gravity so that each side of the towed agricultural implement is subject to equal bearing loads.

2. The towed agricultural implement of claim 1, wherein the first headstock element comprises first and second walls, a generally vertical member extending between the first wall and the second wall, the generally vertical member comprising a tubular support between smaller and larger portions of the generally vertical member, and the second headstock element is secured to the chassis and comprises a central web separating front and rear panels each provided with bushings, the pivot pin extending through the tubular support and the bushings.

3. The towed agricultural implement of claim 2, wherein the central web also separates first and second side walls, the second headstock element further comprising a pin extending between the first and second side walls, a stop plate located in a predetermined position on the pin, an abutment plate mounted on the pin for abutting the smaller portion of the first headstock element, wherein the biasing member is located on the pin between the stop plate and the abutment plate and wherein the stop plate is adjustable on the pin.

4. The towed agricultural implement of claim 2, wherein the biasing member comprises an elastic spring.

5. The towed agricultural implement according to claim 4, wherein the elastic spring is a helical spring.

6. The towed agricultural implement of claim 1, wherein the plurality of working implements comprise cutting units for a mower.

7. The towed agricultural implement of claim 1, wherein the plurality of working implements comprise cutting units and a conditioner for a mower.

* * * * *